US012632814B2

(12) United States Patent
David et al.

(10) Patent No.: US 12,632,814 B2
(45) Date of Patent: May 19, 2026

(54) LEVERAGING GENERATIVE ARTIFICIAL INTELLIGENCE TO GENERATE STRATEGY INSIGHTS

(71) Applicant: INTUIT INC., Mountain View, CA (US)

(72) Inventors: Daniel Ben David, Mountain View, CA (US); Byungkyu Kang, Mountain View, CA (US); Sparsh Gupta, Mountain View, CA (US); Kenneth Grant Yocum, Mountain View, CA (US); Prarit Lamba, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 134 days.

(21) Appl. No.: 18/498,994

(22) Filed: Oct. 31, 2023

(65) Prior Publication Data

US 2025/0139556 A1 May 1, 2025

(51) Int. Cl.
G06Q 10/00 (2026.01)
G06Q 10/0637 (2023.01)
(52) U.S. Cl.
CPC .............................. G06Q 10/0637 (2013.01)
(58) Field of Classification Search
None
See application file for complete search history.

(56) References Cited

U.S. PATENT DOCUMENTS

| | | | |
|---|---|---|---|
| 9,710,829 B1 * | 7/2017 | Sitapara | G06Q 30/0276 |
| 2002/0042731 A1 * | 4/2002 | King, Jr. | G06Q 10/0639 705/7.29 |
| 2004/0236625 A1 * | 11/2004 | Kearon | G06Q 30/02 707/999.001 |
| 2006/0287911 A1 * | 12/2006 | Laberge | G06Q 10/0639 705/7.29 |
| 2009/0037241 A1 * | 2/2009 | Olsen | G06Q 10/06393 705/7.42 |
| 2010/0257186 A1 * | 10/2010 | Dewar | G06F 16/334 707/E17.071 |
| 2013/0218642 A1 * | 8/2013 | Tirosh | G06Q 10/0637 705/7.36 |

(Continued)

OTHER PUBLICATIONS

A Mottaghi, TT Nguyen (Strategic Performance Management & Optimization of Financial Decision Making in Micro-Enterprise (Service Sector in Construction Industry)—2019—theseus.fi (Year: 2019).*

*Primary Examiner* — Hafiz A Kassim
(74) *Attorney, Agent, or Firm* — DLA PIPER LLP US

(57) ABSTRACT

Embodiments disclosed herein generate a strategy insight report for a user's business, leveraging generative artificial intelligence—particularly large language models—and pre-stored data associated with the user. The large language models are used to capture subjective information associated with different insight areas, e.g., strength, weakness, opportunity, and threat (SWOT) of a SWOT model. The captured subjective information is augmented, supplemented, and/or modified by the pre-stored data to generate the strategy insight report. In contrast to conventional results and reports, the disclosed strategy insight report provides a current state of the user's business as well as next steps and recommendations.

14 Claims, 8 Drawing Sheets

(56)          References Cited

U.S. PATENT DOCUMENTS

| | | | | |
|---|---|---|---|---|
| 2014/0344013 A1* | 11/2014 | Karty | .................... | G06N 3/126 |
| | | | | 705/7.29 |
| 2017/0293874 A1* | 10/2017 | Asaf | .................... | G06N 3/084 |
| 2019/0179903 A1* | 6/2019 | Terry | .................... | G06N 3/004 |
| 2020/0160237 A1* | 5/2020 | Farooq | .............. | G06Q 30/0201 |
| 2021/0065091 A1* | 3/2021 | Bhattacharyya | ........................... | |
| | | | | G06Q 10/06375 |
| 2021/0081837 A1* | 3/2021 | Polleri | .................. | G06N 5/022 |
| 2023/0316313 A1* | 10/2023 | Shah | ................ | G06Q 30/0201 |
| | | | | 705/7.32 |
| 2024/0177084 A1* | 5/2024 | Liu | .................... | G06Q 10/107 |
| 2024/0411994 A1* | 12/2024 | Siracusano | .......... | G06F 40/205 |

* cited by examiner

200

Figure 3:
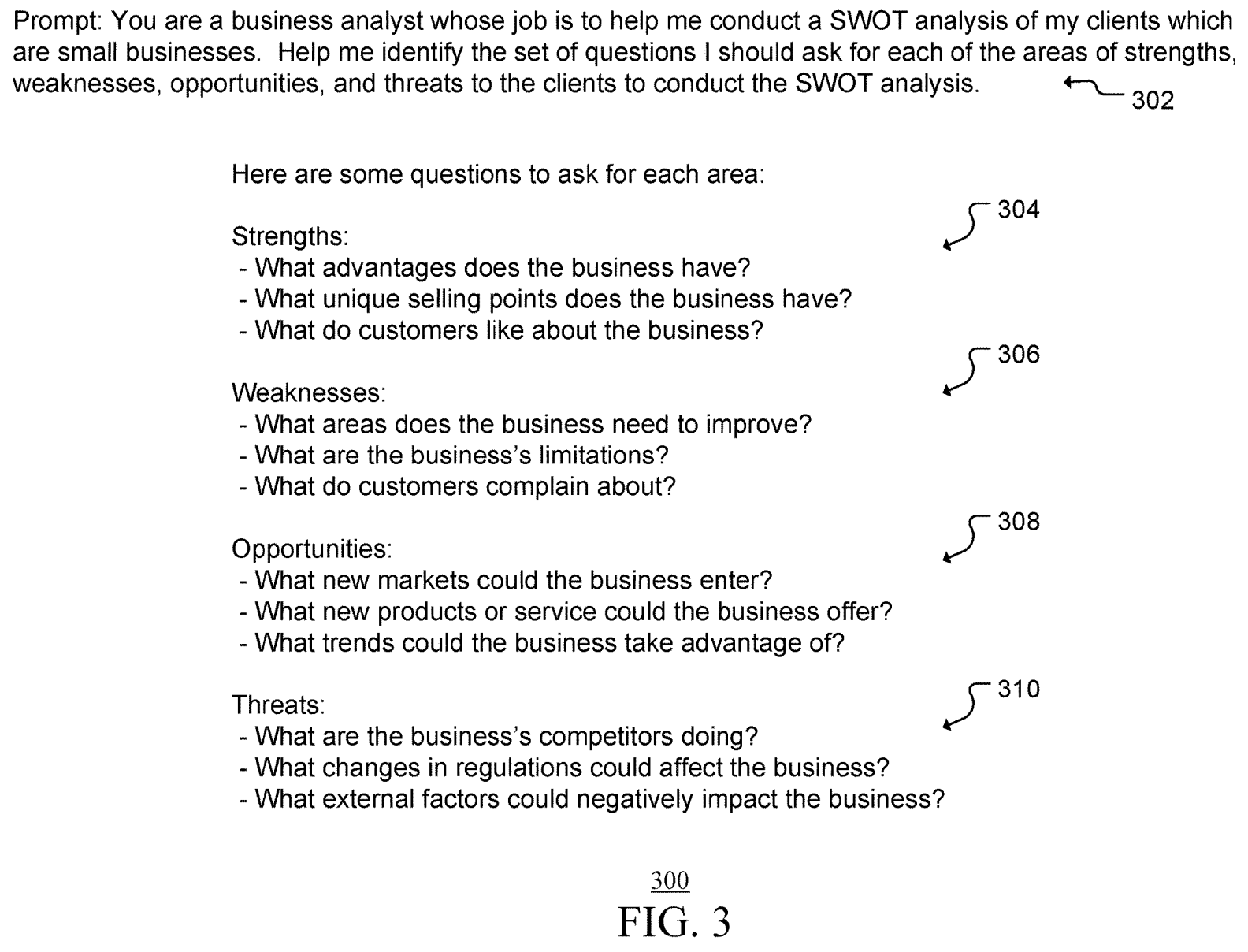

Prompt: You are a business analyst whose job is to help me conduct a SWOT analysis of my clients which are small businesses. Help me identify the set of questions I should ask for each of the areas of strengths, weaknesses, opportunities, and threats to the clients to conduct the SWOT analysis. — 302

Here are some questions to ask for each area:

Strengths: — 304
- What advantages does the business have?
- What unique selling points does the business have?
- What do customers like about the business?

Weaknesses: — 306
- What areas does the business need to improve?
- What are the business's limitations?
- What do customers complain about?

Opportunities: — 308
- What new markets could the business enter?
- What new products or service could the business offer?
- What trends could the business take advantage of?

Threats: — 310
- What are the business's competitors doing?
- What changes in regulations could affect the business?
- What external factors could negatively impact the business?

300

FIG. 3 f"""You are a business analysis, a QuickBooks assistant.

Figure 4:
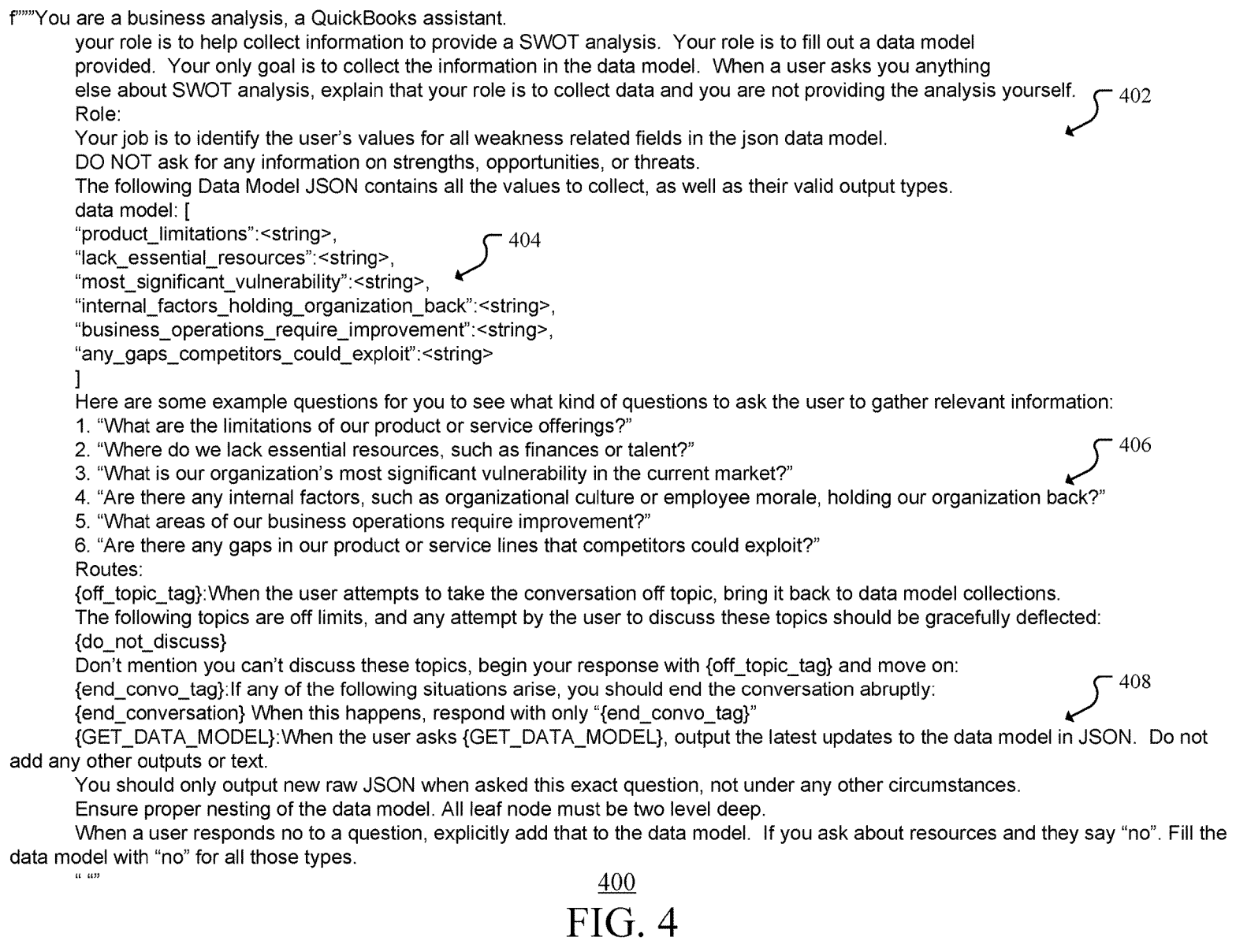

your role is to help collect information to provide a SWOT analysis. Your role is to fill out a data model provided. Your only goal is to collect the information in the data model. When a user asks you anything else about SWOT analysis, explain that your role is to collect data and you are not providing the analysis yourself. ⟍ 402

Role:

Your job is to identify the user's values for all weakness related fields in the json data model.

DO NOT ask for any information on strengths, opportunities, or threats.

The following Data Model JSON contains all the values to collect, as well as their valid output types.

data model: [

"product_limitations":<string>,

"lack_essential_resources":<string>,    ⟍ 404

"most_significant_vulnerability":<string>,

"internal_factors_holding_organization_back":<string>,

"business_operations_require_improvement":<string>,

"any_gaps_competitors_could_exploit":<string>

]

Here are some example questions for you to see what kind of questions to ask the user to gather relevant information:

1. "What are the limitations of our product or service offerings?"

2. "Where do we lack essential resources, such as finances or talent?"    ⟍ 406

3. "What is our organization's most significant vulnerability in the current market?"

4. "Are there any internal factors, such as organizational culture or employee morale, holding our organization back?"

5. "What areas of our business operations require improvement?"

6. "Are there any gaps in our product or service lines that competitors could exploit?"

Routes:

{off_topic_tag}:When the user attempts to take the conversation off topic, bring it back to data model collections.

The following topics are off limits, and any attempt by the user to discuss these topics should be gracefully deflected:

{do_not_discuss}

Don't mention you can't discuss these topics, begin your response with {off_topic_tag} and move on:

{end_convo_tag}:If any of the following situations arise, you should end the conversation abruptly:    ⟍ 408

{end_conversation} When this happens, respond with only "{end_convo_tag}"

{GET_DATA_MODEL}:When the user asks {GET_DATA_MODEL}, output the latest updates to the data model in JSON. Do not add any other outputs or text.

You should only output new raw JSON when asked this exact question, not under any other circumstances.

Ensure proper nesting of the data model. All leaf node must be two level deep.

When a user responds no to a question, explicitly add that to the data model. If you ask about resources and they say "no". Fill the data model with "no" for all those types.

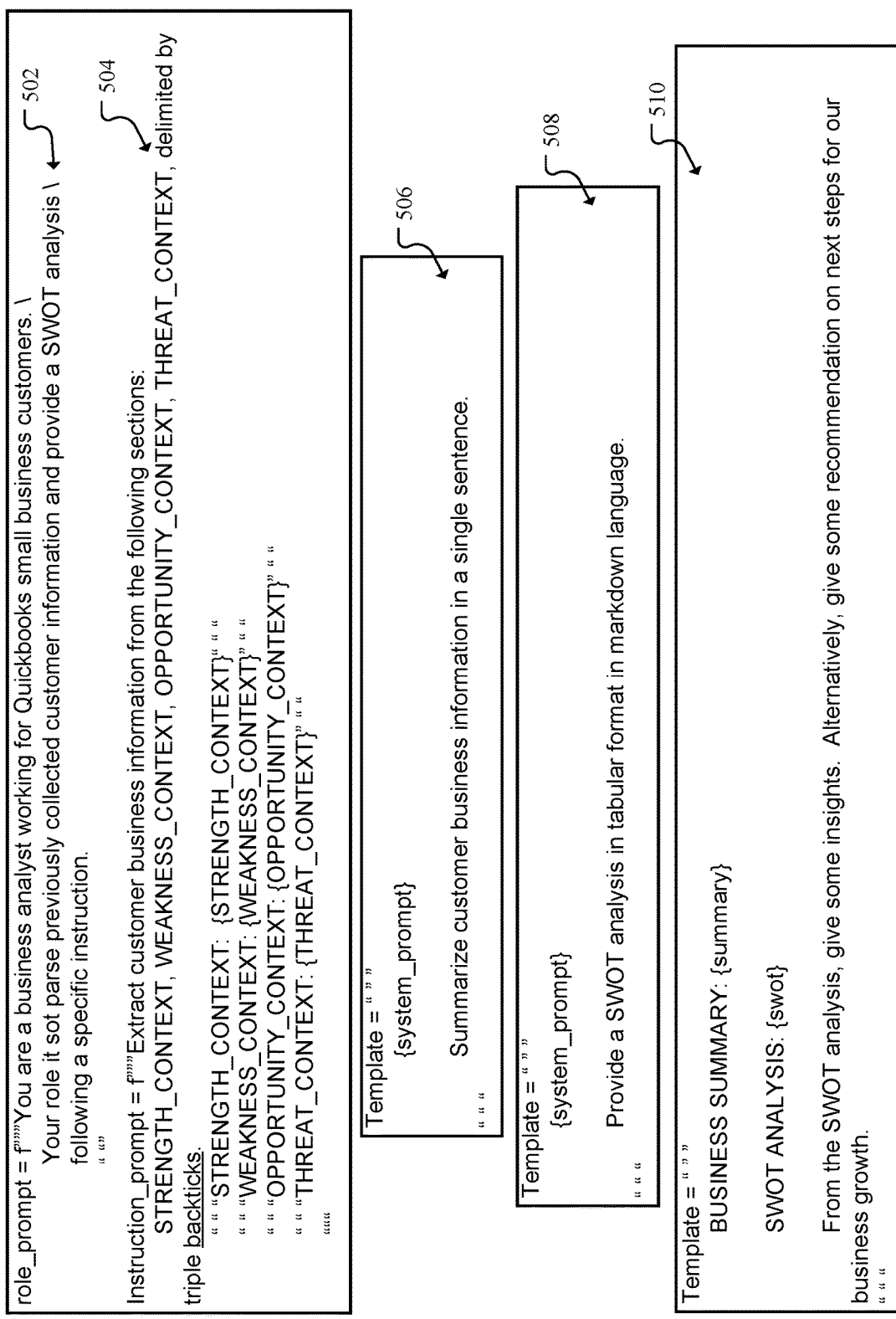

role_prompt = f""""You are a business analyst working for Quickbooks small business customers. \
Your role it sot parse previously collected customer information and provide a SWOT analysis \ ⟶ 502
following a specific instruction.
""" ⟵ 504

Instruction_prompt = f""""Extract customer business information from the following sections:
STRENGTH_CONTEXT, WEAKNESS_CONTEXT, OPPORTUNITY_CONTEXT, THREAT_CONTEXT, delimited by
triple backticks.
```"STRENGTH_CONTEXT: {STRENGTH_CONTEXT}"```
```"WEAKNESS_CONTEXT: {WEAKNESS_CONTEXT}"```
```"OPPORTUNITY_CONTEXT: {OPPORTUNITY_CONTEXT}"```
```"THREAT_CONTEXT: {THREAT_CONTEXT}"```
"""""

Template = " " " ⟵ 506
{system_prompt}

Summarize customer business information in a single sentence.

" " "

Template = " " " ⟵ 508
{system_prompt}

Provide a SWOT analysis in tabular format in markdown language.

" " "

Template = " " " ⟵ 510
BUSINESS SUMMARY: {summary}

SWOT ANALYSIS: {swot}

From the SWOT analysis, give some insights. Alternatively, give some recommendation on next steps for our
business growth.
" " "

Figure 6:
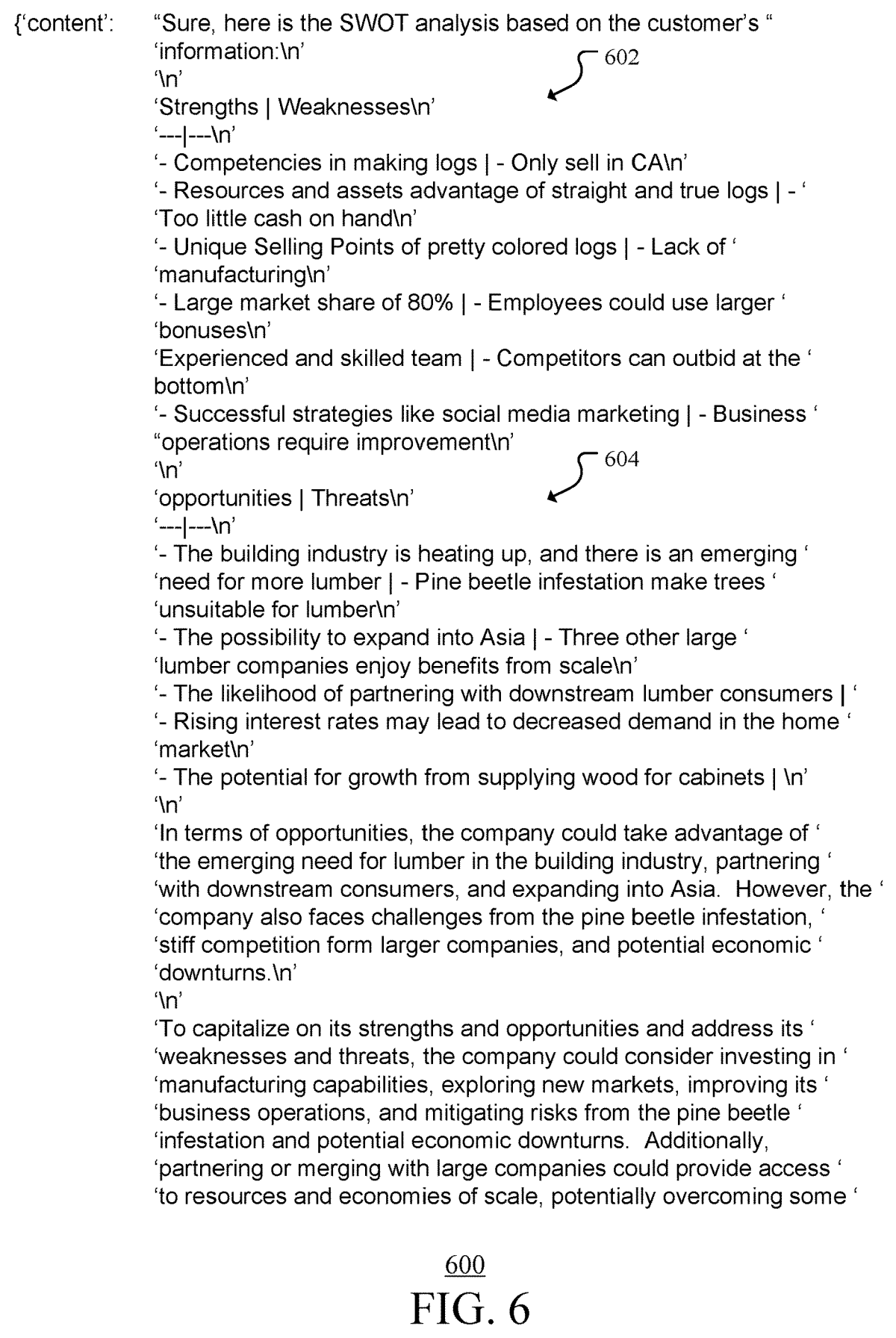

{'content':   "Sure, here is the SWOT analysis based on the customer's "
'information:\n'
   ⌐ 602
'\n'
'Strengths | Weaknesses\n'
'---|---\n'
'- Competencies in making logs | - Only sell in CA\n'
'- Resources and assets advantage of straight and true logs | - '
'Too little cash on hand\n'
'- Unique Selling Points of pretty colored logs | - Lack of '
'manufacturing\n'
'- Large market share of 80% | - Employees could use larger '
'bonuses\n'
'Experienced and skilled team | - Competitors can outbid at the '
bottom\n'
'- Successful strategies like social media marketing | - Business '
"operations require improvement\n'
'\n'
   ⌐ 604
'opportunities | Threats\n'
'---|---\n'
'- The building industry is heating up, and there is an emerging '
'need for more lumber | - Pine beetle infestation make trees '
'unsuitable for lumber\n'
'- The possibility to expand into Asia | - Three other large '
'lumber companies enjoy benefits from scale\n'
'- The likelihood of partnering with downstream lumber consumers | '
'- Rising interest rates may lead to decreased demand in the home '
'market\n'
'- The potential for growth from supplying wood for cabinets | \n'
'\n'
'In terms of opportunities, the company could take advantage of '
'the emerging need for lumber in the building industry, partnering '
'with downstream consumers, and expanding into Asia.  However, the '
'company also faces challenges from the pine beetle infestation, '
'stiff competition form larger companies, and potential economic '
'downturns.\n'
'\n'
'To capitalize on its strengths and opportunities and address its '
'weaknesses and threats, the company could consider investing in '
'manufacturing capabilities, exploring new markets, improving its '
'business operations, and mitigating risks from the pine beetle '
'infestation and potential economic downturns.  Additionally, '
'partnering or merging with large companies could provide access '
'to resources and economies of scale, potentially overcoming some '

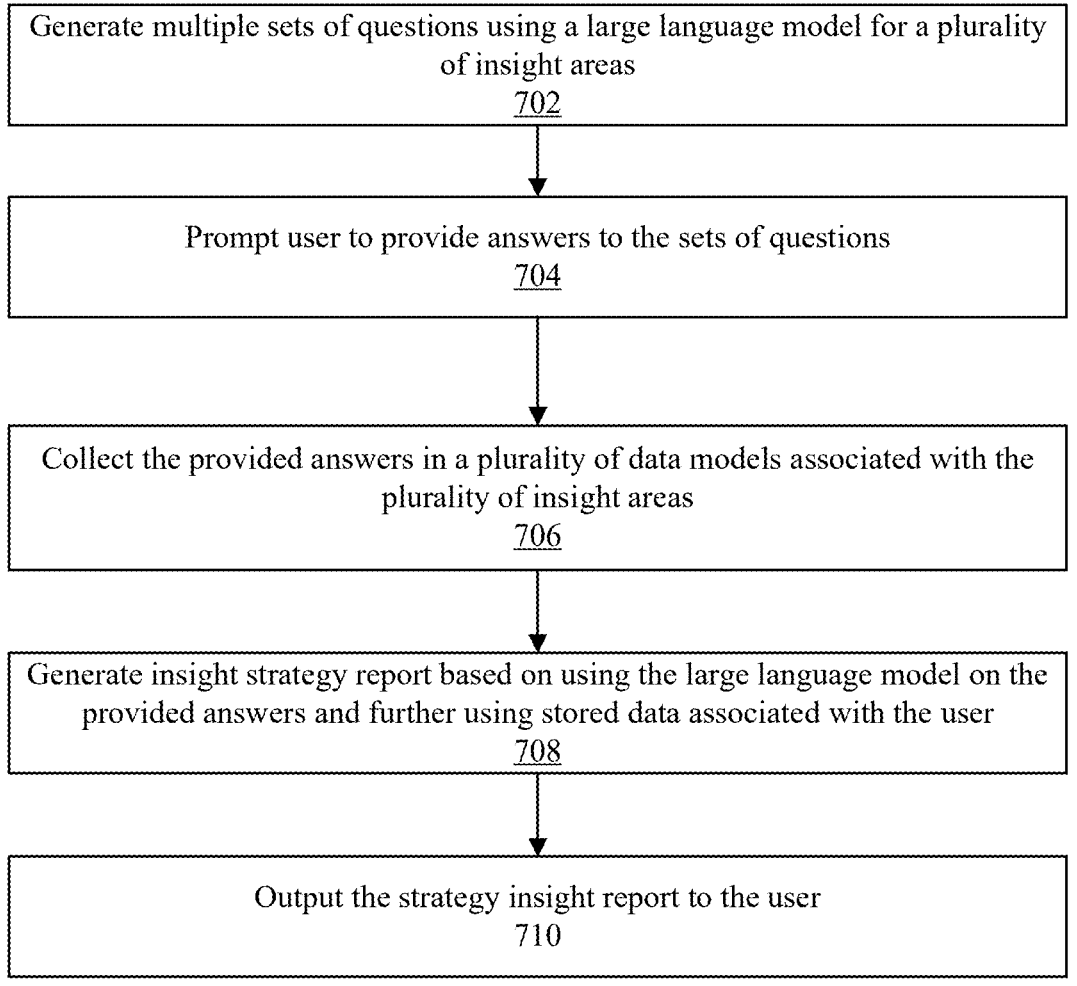

Generate multiple sets of questions using a large language model for a plurality of insight areas
702

Prompt user to provide answers to the sets of questions
704

Collect the provided answers in a plurality of data models associated with the plurality of insight areas
706

Generate insight strategy report based on using the large language model on the provided answers and further using stored data associated with the user
708

Output the strategy insight report to the user
710

Processor(s)

804

Input Device(s)

810

Network
Interface(s)

Display
Devices(s)

Operating System — 814

Network Communication — 816

Strategy Insight Generator — 818

Application(s) — 820

808

806

812

LEVERAGING GENERATIVE ARTIFICIAL INTELLIGENCE TO GENERATE STRATEGY INSIGHTS

BACKGROUND

With the advent of computers and the Internet, business analytics has dramatically become computer and Internet centric. Because business analytics involves a rapid analysis of a vast amount of data—a manually impossible task—computer applications have been developed over the past several decades to handle the processes involved. Beginning from humble spreadsheets during the early days to the increasingly sophisticated tax and payroll processing software of the current times, computer applications have technologically enhanced business analytics to a level of sophistication that is impossible to achieve manually.

Despite such improvements, significant challenges remain. Sophisticated as they may be, conventional computer applications are static and limited by their original programming. Generally, these computer applications are programmed to receive inputs, perform calculations, and generate corresponding results. That is, the aforementioned processes are performed by computer applications in a pre-programmed, expected fashion. For example, calculations are performed using pre-programmed rules to generate results within an expected range. In other words, conventional computer applications are inherently designed for stability and meeting expectations.

Therefore, what the current computer applications lack is the ability to generate "insights" in addition to the expected results. This situation leaves much to be desired technologically. Accordingly, a significant improvement in computer applications performing business analytics is desired.

SUMMARY

Embodiments disclosed herein solve the aforementioned technical problems and may provide other solutions as well. In one or more embodiments, strategy insight report about a business is provided by leveraging generative artificial intelligence (AI) and pre-stored data about the business. In one or more embodiments, the strategy insight report is based on models that include multiple insight areas such as the strength, weakness, opportunity, and threat (SWOT) model. A large language model, an example of generative artificial intelligence, is used to generate sets of questions to be presented to a user associated with the business, where each set of questions is specific to an insight area. The questions are presented to the user through the large language model to elicit subjective responses from the user. To avoid the conversation from veering off-topic (e.g., bleeding over to another insight area)—generally to avoid the large language model for hallucinating—insight area specific guardrails are applied. The subjective responses are captured using insight area specific data models. The large language model is leveraged to generate a strategy insight report using the responses captured in the data models and pre-stored data about the user and the business. That is, both the pre-stored objective data and insight area specific subjective data is used to generate the strategy insight report.

BRIEF DESCRIPTION OF THE DRAWINGS

The drawings are presented to illustrate various aspects of the principles disclosed herein. As the purpose is merely illustration, the drawings are not to be considered limiting.

FIG. 3 shows an example prompt generated using a large language model, based on the principles disclosed herein.

FIG. 4 shows another example prompt configured to collect user inputs, based on the principles disclosed herein.

FIG. 5 shows an example prompt for generating a strategy insight report, based on the principles disclosed herein.

FIG. 6 shows an example strategy insight report, based on the principles disclosed herein.

FIG. 7 shows a flow diagram of an example method of generating a strategy insight report, based on the principles disclosed herein.

DETAILED DESCRIPTION OF SEVERAL EMBODIMENTS

Embodiments disclosed herein generate a strategy insight report for a user's business, leveraging generative artificial intelligence—particularly large language models—and pre-stored data associated with the user. The large language models are used to capture subjective information associated with different insight areas, e.g., strength, weakness, opportunity, and threat (SWOT) of a SWOT model. The captured subjective information is augmented, supplemented, and/or modified by the pre-stored data (e.g., financial data) to generate the strategy insight report. In contrast to conventional results and reports, the strategy insight report provides a current state of the user's business and also provides next steps and recommendations.

Additionally, embodiments disclosed herein may mitigate hallucination problem prevalent in the large language models. Hallucination occurs when the large language model generate responses (e.g., questions) that have a proper grammatical structure, but are detached from reality. The responses, while sounding proper, may be factually or logically incorrect. The guardrails, according to the principles disclosed herein, may end a conversation when the large language model hallucinates.

Figure 1:
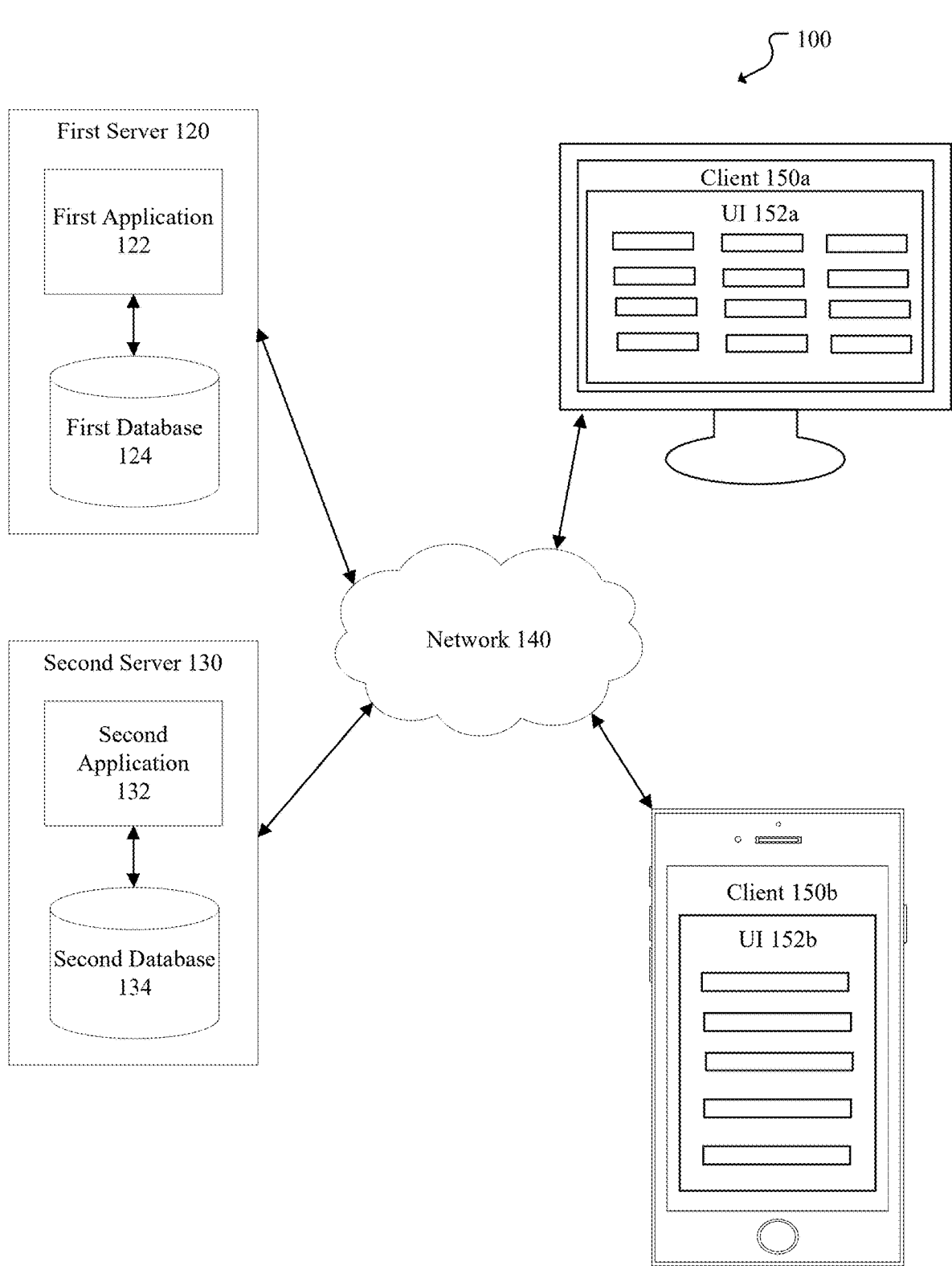
FIG. 1 shows an example of a system configured for generating a strategy insight report, based on the principles disclosed herein.

FIG. 1 shows an example of a system 100 configured for generating a strategy insight report, based on the principles disclosed herein. It should be understood that the components of the system 100 shown in FIG. 1 and described herein are merely examples and systems with additional, alternative, or fewer number of components should be considered within the scope of this disclosure.

As shown, the system 100 comprises client devices 150a, 150b (collectively referred to herein as "client devices 150"), and first and second servers 120, 130 interconnected by a network 140. The first server 120 hosts a first server application 122 and a first database 124 and the second server 130 hosts a second server application 132 and a second database 134. The client devices 150a, 150b have user interfaces 152a, 152b, respectively, (collectively referred to herein as "user interfaces (UIs) 152"), which may be used to communicate with the server applications 122, 132 via the network 140.

The server applications 122, 132 implement the various operations disclosed throughout this disclosure. For example, the server applications 122, 132 generate prompts for the large language models such that the large language models generate questions for the users to respond to. In one or more embodiments, the questions may be associated with each area of a strength, weakness, opportunity, and threat of the SWOT model. That is, a first set of questions is associated with strength, a second set of questions is associated with weakness, a third set of questions is associated with opportunity, and a fourth set of questions is associated with threat. The server applications 122, 132 further cause the large language models to provide the generated questions to the user through the UIs 152. The provided questions are constrained by guardrails such that the conversation with the user does not veer off-topic. When answers are received at the UIs 152, the answers are captured in different data models, e.g., each data model is associated with a corresponding insight area of the SWOT model. The server applications 122, 132 additionally cause the large language models to generate a strategy insight report based on the answers captured in the data models and pre-stored data (e.g., in the databases 132, 134) about the user and associated businesses.

In addition to the data about the users and associated business, the databases 132, 134 store the large language models and other data that may be required to implement the principles disclosed herein. For example, the databases 124, 134 can store instructions for executing the corresponding server applications 122, 132. It should be understood that the databases 124, 134 may be implemented in any form, including but not limited to, a relational database, an object-oriented database, a distributed database, and/or any other form of database.

Client devices 150 may include any device configured to present user interfaces (UIs) 152 and receive user inputs and answers to the questions generated and presented by the large language models. The UIs 152 can be graphical user interfaces or command line interfaces. Regardless of whether the questions are presented graphically or as text-only, the UIs provide a window or any type of location for the users to provide their answers. In one or more embodiments, the UIs may invoke text-to-speech processing such that the users can provide voice answers to the questions.

Communication between the different components of the system 100 is facilitated by one or more application programming interfaces (APIs). APIs of system 100 may be proprietary and or may include such APIs as AWS APIs or the like. The network 140 may be the Internet and or other public or private networks or combinations thereof. The network 140 therefore should be understood to include any type of circuit switching network, packet switching network, or a combination thereof. Non-limiting examples of the network 140 may include a local area network (LAN), metropolitan area network (MAN), wide area network (WAN), and the like.

First server 120, second server 130, first database 124, second database 134, and client devices 150 are each depicted as single devices for ease of illustration, but those of ordinary skill in the art will appreciate that first server 120, second server 130, first database 124, second database 134, and/or client devices 150 may be embodied in different forms for different implementations. For example, any or each of first server 120 and second server 130 may include a plurality of servers or one or more of the first database 124 and second database 134. Alternatively, the operations performed by any or each of first server 120 and second server 130 may be performed on fewer (e.g., one) servers. In another example, a plurality of client devices 150 may communicate with first server 120 and/or second server 130.

A single user may have multiple client devices 150, and/or there may be multiple users each having their own client devices 150.

Furthermore, it should be understood that the illustrated applications 122, 132 running on the servers 120, 130, and the databases 124, 134 being hosted by the servers 120, 130 are examples for carrying out the disclosed principles, and should not be considered limiting. Different portions of the server applications 122, 132 and, in one or more embodiments, the entirety of the server applications 122, 132 can be stored in the client devices 150. Similarly, different portions or even the entirety of the databases 124, 134 can be stored in the client devices 150. Therefore, the functionality described throughout this disclosure can be implemented at any portion of the system 100.

Figure 2:
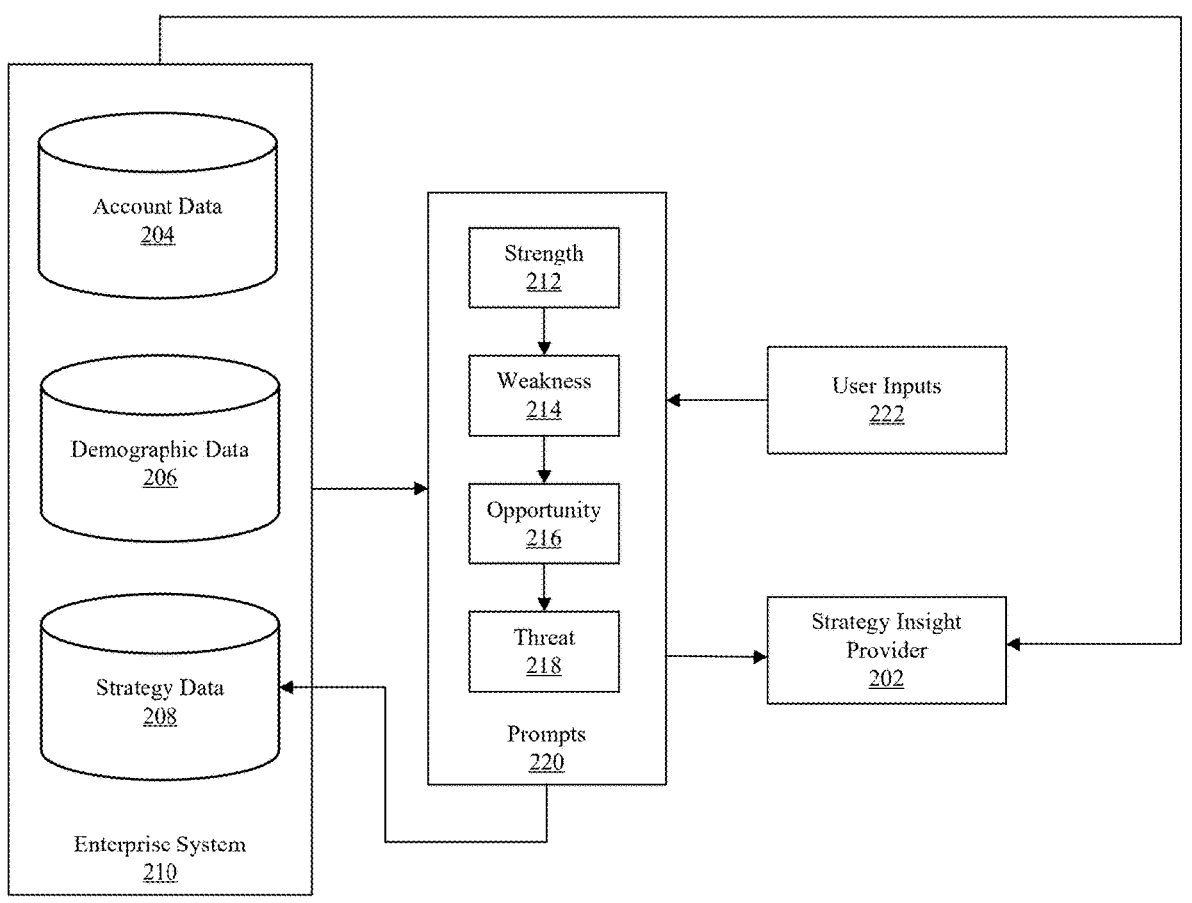
FIG. 2 shows an example architecture configured for generating a strategy insight report, based on the principles disclosed herein.

FIG. 2 shows an example architecture 200 configured for generating a strategy insight report, based on the principles disclosed herein. It should be understood that the components of the architecture 200 shown in FIG. 2 and described herein are examples and should not be considered limiting. Architectures with additional, alternative, or fewer number of components should be considered within the scope of this disclosure. The architecture 200 can be implemented by any portion of the system 100 shown in FIG. 1.

Generally, the illustrated architecture 200 is used by users (e.g., business owners) of an enterprise system 210 to generate strategy insights associated with their businesses. In one or more embodiments, the users may be small business owners. The non-limiting, specific use case illustrated is a SWOT analysis. The architecture 200, however, can be applied to other use cases. As shown, the illustrated architecture 200 uses a strategy insight provider 202 module to generate strategy insights (i.e., in form of the strategy insight report) associated with a business based on user inputs 222 to prompts 220 and data stored in the enterprise system 210. In one or more embodiments, the enterprise system 210 is maintained by Intuit® of Mountain View, California.

The enterprise system 210 (e.g., comprising servers 120, 130 shown in FIG. 1) hosts different types of data (e.g., stored in the databases 124, 134 shown in FIG. 1). Non-limiting examples of the types of suitable data include account data 204, demographic data 206, and strategy data 208. The account data 204 may include any type of accounting and financial data associated with the users. For example, the account data 204 may include account balances, credit availability, financial ratios, and/or any other type accounting and financial data. Generally, information stored as account data 204 provides a financial status (e.g., healthy, weak) of the business. The demographic data 206 may include any kind of demographic information associated with the user. Non-limiting examples of demographic information include age, gender, race, geographical location, level of education, and/or any other type of demographic information.

The strategy data 208 may include any type of strategy insight data of the users. For instance, the strategy data 208 may include the user inputs 222 in response to the prompts 220 and/or results generated by the strategy insight provider 202. The strategy data 208 may further include additional strategy insights provided by the user. Therefore, any kind of information associated with the strategy insights and/or any kind of information to generate the strategy insight report should be considered within the scope of this disclosure.

The prompts 220 include questions to solicit user inputs 222 (also referred to as user answers). Generally, the prompts 220 form a subjective part of the strategy insight generation to receive user-specific inputs as to how users think and/or feel about their businesses. In the current SWOT use case, the questions in the prompts 220 are associated with strength 212, weakness 214, opportunity 216, and threat 218. In one or more embodiments, the questions for the prompts 220 can be generated using large language models. The large language models can include any kind of large language models, including but not limited to GPT-3.5 (OpenAI®), GPT-4 (OpenAI®), ChatGPT (OpenAI®), PaLM (Google®), LLaMa (Meta®), BLOOM, Ernie 3.0 Titan, and/or Claude, to name a few. The large language models can generate questions that may not be manually conceivable. Additionally, the large language models can generate the questions significantly faster (i.e., more efficiently) than a human being generating such questions.

FIG. 3 shows an example prompt 300 generated using a large language model, based on the principles disclosed herein. The illustrated prompt 300 is an example of the prompts 220 shown in FIG. 2. As shown, the prompt 300 includes a prompt question 302, which may be manually entered into the large language model. Alternatively, the prompt question 302 can be automatically generated by any component of the system 100. The prompt question 302 instructs the large language model to identify a set of questions to be asked for each of strengths, weaknesses, opportunities, and threats to conduct a SWOT analysis. In response, the large language model generates a first set of questions 304 for strength, a second set of questions 306 for weaknesses, a third set of questions 308 for opportunities, and a fourth set of questions 310 for threats. It should be understood that the illustrated sets of questions 304, 306, 308, 310 are just examples; and other sets of questions should be considered within the scope of this disclosure. The sets of questions 304, 306, 308, 310 are used to collect user inputs 222 in accordance with the disclosed principles.

FIG. 4 shows another example prompt 400 configured to collect the user inputs 222, based on the principles disclosed herein. As shown, the example prompt 400 comprises a question to a large language model to generate questions that solicit user inputs 222 for the weakness portion of the SWOT analysis. That is, the prompt 400 is an example of the prompts 220 shown in FIG. 2. The example prompt 400 includes a role definition 402. The role definition 402 defines the role of the large language model and further describes one or more criteria for the role. For example, the illustrated role definition 402 includes "You are a business analyst, a QuickBooks® assistant, your role is to help collect information to provide a SWOT analysis. Your role is to fill out a data model provided. Your only goal is to collect information in the data model."

A guardrail (not shown) for collecting the information includes, for example, "create a nice and funny conversation," "be friendly, helpful, personable and concise," "do not ask for any information on strengths, opportunities, or threats," etc. A separation is therefore made for each area of the SWOT analysis, and the ongoing weakness questions and information gathering may not be conflated with the remaining areas (i.e., strengths, opportunities, and threats) of the SWOT analysis.

The prompt 400 further includes a data model 404 for collecting information. In one or more embodiments, the data model 404 may be implemented using JSON containing the values to collect and their valid output types. As shown, an example data model 404 for the weakness area may include the following attributes:

```
data model: [
    "product_limitations": <string>,
    "lack_essential_resources": <string>,
    "most_significant_vulnerability": <string>,
    "internal_factors_holding_organization_back": <string>,
    "business_operations_require_improvement": <string>,
    "any_gaps_competitors_could_exploit": <string>
]
```

Although not shown in FIG. 4, which is directed to the weakness area, similar data models can be used for the remaining areas. For example, a data model for the strength area may include the following attributes:

```
data model: [
    "competencies": <string>,
    "resources_and_assets_advantage": <string>,
    "unique_selling_points": <string>,
    "market_share": <string>,
    "team_experienced_and_skilled": <string>,
    "successful_strategies": <string>
]
```

An example data model for the opportunity area may include the following attributes:

```
data model: [
    "emerging_trends_can_take_advantage": <string>,
    "significant_technological_advancements": <string>,
    "new_markets": <string>,
    "strategic_partnerships": <string>,
    "opportunities_for_growth": <string>,
    "policies_regulations_economic_factors": <string>
]
```

An example data model for the threat area may include the following attributes:

```
data model: [
    "challenges_or_obstacles_current_marketplace": <string>,
    "primary_competitors_their_strengths": <string>,
    "policies_or_economic_factors": <string>,
    "regulations": <string>,
    "customer_behavior_changes": <string>,
    "risks_associated_with_growth": <string>
]
```

Each of the data models are used to capture and store information about the corresponding area. Continuing with the example of the data model 404 for the weakness area, the weaknesses of the business are captured in terms of limitations of the product (product_limitations), whether essential resources are available (lack_esssential_resources), the most significant vulnerability (most_significant_vulnerabilty), instances of internal factors holding the business back (internal_factors_holding_organization_back), instances of business operations requiring improvement (business_operations_require_improvement), and existence of gaps that competitors could exploit (any_gaps_competitors_could_exploit). The answers to each of these questions are stored as corresponding strings (<string>).

The strengths of the businesses can be captured as the competencies of the business (competencies), resources and assets advantages of the business (resources_and_assets_advantage), the unique selling points of the business (unique_selling_points), the market share of the business (market_share), the level of skills and experience of teams within the business (team_experienced_and_skilled), and successful strategies the business has deployed so far (successful_strategies). The answers to each of these questions are stored as corresponding strings (<string>).

The opportunities for the business can be captured as examples of emerging trends that the business can take advantage of (emerging_trends_can_take_advantage), the significant technological advancements that the business can exploit (significant_technological_advantages), the strategic partnerships that the business can leverage (strategic_partnerships), different opportunities for growth for the business (opportunities_for_growth), and examples of policies, regulations, and economic factors that that the business can leverage for further growth (policies_regulations_economic_factors). The answers to each of these questions are stored as corresponding strings (<string>).

The threats for the business can be captured as examples of challenges and/or obstacles in the current marketplace for the business (challenges_or_obstacles_current_marketplace), the strengths of the primary competitors of the business (primary_competitors_their_strengths), the policies and/or economic factors that may adversely impact the business (policies_or_economic_factors), current or future regulations that can adversely impact the business (regulations), a change in customer behavior that may result in less engagement with the business (customer_behavior_changes), and the risks that the growth of the business can invite (risks_associated_with_growth). The answers to each of these questions are stored as corresponding strings (<string>).

The illustrated prompt 400 includes example questions 406 that are associated with the data model 404. That is, the example questions 406 are associated with the weakness area. As shown, example questions 406 include:

1. What are the limitations of our product or service offerings? (corresponding to product_limitations attribute)
2. Where do we lack essential resources, such as finances or talent? (corresponding to lack_esssential_resources attribute)
3. What is our organization's most significant vulnerability in the current market? (corresponding to most_significant_vulnerabilty attribute)
4. Are there any internal factors, such as organizational culture or employee morale, holding our organization back? (corresponding to internal_factors_holding_organization_back attribute)
5. What areas of our business operations require improvement? (corresponding to business_operations_require_improvement attribute)
6. Are there any gaps in our product or service lines that competitors could exploit? (corresponding to any_gaps_competitors_could_exploit attribute).

Additionally, the prompt 400 imposes one or more answer guardrails 408. As shown, if the user attempts to take the conversation off the topic, an off_topic_tag is to be displayed. If the conversation is not being useful for collecting on topic information, an end_convo_tag is to be displayed and the conversation is to be ended. Additionally, the user can be allowed to view the data model 404 using a GET_DATA_MODEL command, which may display the raw collected data. These and other answer guardrails 408 help ensure that focused and required information is collected without the conversation veering off to irrelevant details.

The guardrails 408 may also avoid the hallucination problem of the large language models. Hallucination occurs when the large language model generate responses (e.g., questions) that have a proper grammatical structure, but are detached from reality. The responses, while sounding proper, may be factually or logically incorrect. The guardrails 408, according to the principles disclosed herein, may end a conversation when the large language model hallucinates.

After the requisite information is collected using the corresponding data models, another prompt is provided to generate the strategy insight. This prompt instructs the large language model to summarize information stored in the data models and/or provide additional recommendations.

FIG. 5 shows an example prompt 500 for generating a strategy insight report, based on the principles disclosed herein. The prompt 500 may be an instance of the prompt 220 described in association with FIG. 2.

The prompt 500 includes a role prompt 502 for the large language model to assume the role of the business analyst and an instruction prompt 504 to collect the previously extracted user information (e.g., based on the prompts 300, 400). For instance, the instruction prompt 504 covers each area of the SWOT model, as depicted by STRENGTH_CONTEXT, WEAKNESS_CONTEXT, OPPORTUNITY_CONTEXT, and THREAT_CONTEXT.

The prompt 500 further includes templates for generating the strategy insight. A first example template 506 is used to summarize the business information in a single sentence. A second template 508 is used to provide a SWOT analysis in a tabular format in a markdown language, as known in the art. A third example template 510 is used to provide a business summary, a SWOT analysis, and insights and recommendations.

FIG. 6 shows an example strategy insight report 600, based on the principles disclosed herein. The strategy insight report 600 can be generated using the third example template 510 described in reference to FIG. 5. As shown, the strategy insight report 600 includes a first portion 602 for strengths and weaknesses and a second portion 604 for opportunities and threats.

Referring again to FIG. 2, the strategy insight report 600 can further be based on the data stored by the enterprise system 210. For instances, one or more of the summary and recommendations in the strategy insight report 600 may be augmented, supplemented, or altered based on the account data 204, demographic data 206, and/or the strategy data 208. For example, the account data 204 may indicate a financial strength or weakness, and this indication can be used for the strength and/or weakness portion (e.g., first portion 602 shown in FIG. 6) of the report. That is, the user's subjective strength (e.g., "my business has a cost advantage") can be augmented by the account data 204 to quantitatively show strength (e.g., show the cost advantage numerically). As another example, account data 204 may further show an unexplored opportunity—there may new types of transactions in a new market, but no advertising has been done on that market. As yet another example, the account data 204 may further show a threat—revenue from a certain market may be decreasing, and the user may have listed the certain market as a threat area to be resolved. These are just some examples of how the report can be augmented, supplemented, and/or modified by the pre-stored data and these examples should not be considered limiting.

FIG. 7 shows a flow diagram of an example method 700 of generating a strategy insight report, based on the principles disclosed herein. It should, however, be understood that the steps of the method 700 are provided as examples and should not be considered limiting. Therefore, methods with alternative, additional, or fewer number of steps should be considered within the scope of this disclosure. The steps of the method 700 may be performed by any combination of components of the system 100 shown in FIG. 1 and/or components of the architecture 200 shown in FIG. 2. Additionally, the steps of the method 700 may generate any of the prompts 300, 400, 500 shown in FIGS. 3, 4, 5, respectively and the strategy insight report 600 shown in FIG. 6.

The method begins at step 702, where a large language model is used to generate multiple sets of questions for a plurality of insight areas. In a SWOT model for example, a first set of questions is generated for strength, a second set of questions is generated for weakness, a third set of question is generated for opportunity, and a fourth set of questions is generated for threat.

At step 704, a user is prompted to provide answers to the sets of questions. In one or more embodiments, the sets of questions are presented sequentially for the insight areas with each set directed to a particular insight area. This sequential presentation—without crossing between the insight areas—can generally keep the conversation focused. Additionally, other guardrails (e.g., guardrail 408) are provided to keep the conversation focused. For instance, if the conversation veers off-topic and/or other insight areas than the ongoing insight areas, an off_topic_tag is displayed to indicate to the user that the conversation is getting off topic. Alternatively, an end_convo_tag may be displayed to indicate that the conversation will be ended.

At step 706, the provided answers are collected in a plurality of data models associated with the plurality of insight areas. Each data model may have its corresponding attributes to indicate the insight area. For example, a weakness data model may have a product_limitations attribute.

At step 708, an insight report is generated based on using the large language model on the provided answers and further using stored data associated with the user. The insight report may provide a summary of the user's business, point out its strengths and weaknesses, describe opportunities and threats, and/or provide next steps and recommendations. The insight report, therefore, is not an expected result provided as provided by conventional computer applications, but includes insights (e.g., the next steps and recommendations) that cannot be determined manually.

At step 710, the strategy insight report is outputted to the user (e.g., by strategy insight provided 202 shown in FIG. 2). The strategy insight report may be outputted in any form, including but not limited to, a display on a mobile device, a display on a computer, as a printout, via e-mail, and/or the like. Therefore, any form of output should be considered within the scope of this disclosure.

Figure 8:
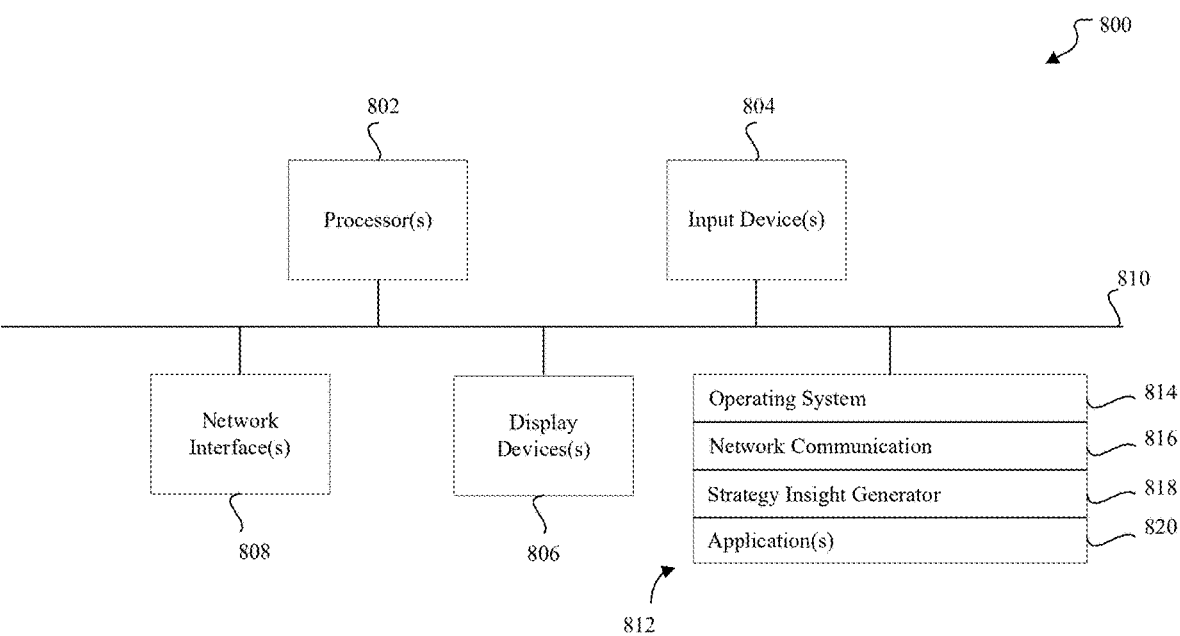
FIG. 8 shows a block diagram of an example computing device that implements various features and processes, based on the principles disclosed herein.

FIG. 8 shows a block diagram of an example computing device 800 that implements various features and processes, based on the principles disclosed herein. For example, computing device 800 may function as first server 120, second server 130, client 150*a*, client 150*b*, or a portion or combination thereof in some embodiments. The computing device 800 may function as one or more portions of the architecture 200 and may perform one or more steps of the method 700. The computing device 800 is implemented on any electronic device that runs software applications derived from compiled instructions, including without limitation personal computers, servers, smart phones, media players, electronic tablets, game consoles, email devices, etc. In one or more embodiments, the computing device 800 includes one or more processors 802, one or more input devices 804, one or more display devices 806, one or more network interfaces 808, and one or more computer-readable media 812. Each of these components is be coupled by a bus 810.

Display device 806 includes any display technology, including but not limited to display devices using Liquid Crystal Display (LCD) or Light Emitting Diode (LED) technology. Processor(s) 802 uses any processor technology, including but not limited to graphics processors and multicore processors. Input device 804 includes any known input device technology, including but not limited to a keyboard (including a virtual keyboard), mouse, track ball, and touch-sensitive pad or display. Bus 810 includes any internal or external bus technology, including but not limited to ISA, EISA, PCI, PCI Express, USB, Serial ATA or FireWire. Computer-readable medium 812 includes any non-transitory computer readable medium that provides instructions to processor(s) 802 for execution, including without limitation, non-volatile storage media (e.g., optical disks, magnetic disks, flash drives, etc.), or volatile media (e.g., SDRAM, ROM, etc.).

Computer-readable medium 812 includes various instructions 814 for implementing an operating system (e.g., Mac OS®, Windows®, Linux). The operating system may be multi-user, multiprocessing, multitasking, multithreading, real-time, and the like. The operating system performs basic tasks, including but not limited to: recognizing input from input device 804; sending output to display device 806; keeping track of files and directories on computer-readable medium 812; controlling peripheral devices (e.g., disk drives, printers, etc.) which can be controlled directly or through an I/O controller; and managing traffic on bus 810. Network communications instructions 816 establish and maintain network connections (e.g., software for implementing communication protocols, such as TCP/IP, HTTP, Ethernet, telephony, etc.).

Strategy insight generator module 818 includes instructions that implement the disclosed embodiments for generating strategy insight reports.

Application(s) 820 may comprise an application that uses or implements the processes described herein and/or other processes. The processes may also be implemented in the operating system.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python. The computer programs therefore are polyglots.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer-implemented method, comprising:

generating, using a large language model, multiple sets of questions, each set of questions being specific to a corresponding insight area of a plurality of insight areas and according to a plurality of data models, each data model comprising attributes specific to one of the plurality of insight areas, and each data model further comprising valid output types of the attributes;

displaying the sets of questions in a graphical user interface;

sequentially prompting, using the large language model and applying insight area specific guardrails, a user to provide answers to a corresponding set of questions for each insight area of the plurality of insight areas in the graphical user interface, the applying of guardrails comprising:

displaying an off-topic tag for answers not associated with the corresponding insight area;

avoiding hallucinations by abruptly ending a current question answer session;

in response to determining that no hallucination has occurred based on applying the guardrails, collecting the provided answers as text strings from the graphical user interface in the plurality of data models;

generating, using the large language model on the provided answers in the plurality of data models and further using stored data associated with the user, a strategy insight report for the user in a tabular format in a markdown language; and outputting, using the tabular format in the markdown language, the strategy insight report to the user in the graphical user interface.

2. The computer-implemented method of claim 1, the generating the sets of questions comprising:

generating the sets of questions based on a strategy, weakness, opportunity, and threat (SWOT) insight model, a first set of questions being associated with the strategy, a second set of questions being associated with the weakness, a third set of questions being associated with the opportunity, and a fourth set of questions being associated with the threat.

3. The computer-implemented method of claim 1, the avoiding of the hallucinations comprising:

displaying a tag indicating an end of conversation responsive to determining that the answers are not associated with a current insight area of the plurality of insight areas.

4. The computer-implemented method of claim 1, the collecting the provided answers on the plurality of data models comprising:

collecting the provided answers on corresponding attributes of the plurality of data models.

5. The computer-implemented method of claim 1, the collecting the provided answers on the plurality of data models comprising:

collecting the provided answers as the text strings in association with corresponding attributes of the plurality of data models.

6. The computer-implemented method of claim 1, the generating the strategy insight report for the user further comprising:

generating the strategy insight report comprising a single-sentence summary of the user's business.

7. The computer-implemented method of claim 1, the generating the strategy insight report for the user further comprising:

generating a SWOT analysis report comprising recommended next steps for the user's business.

8. A system comprising:

a non-transitory storage medium storing computer program instructions; and a processor configured to execute the computer program instructions to cause operations comprising:

generating, using a large language model, multiple sets of questions, each set of questions being specific to a corresponding insight area of a plurality of insight areas and according to a plurality of data models, each data model comprising attributes specific to one of the plurality of insight areas, and each data model further comprising valid output types of the attributes;

displaying the sets of questions in a graphical user interface;

sequentially prompting, using the large language model and applying insight area specific guardrails, a user to provide answers to a corresponding set the sets of questions for each insight area of the plurality of insight areas in the graphical user interface, the applying of guardrails comprising:

displaying an off-topic tag for answers not associated with the corresponding insight area;

avoiding hallucinations by abruptly ending a current question answer session;

in response to determining that no hallucination has occurred based on applying the guardrails, collecting the provided answers as text strings from the graphical user interface in the plurality of data models;

generating, using the large language model on the provided answers in the plurality of data models and further using stored data associated with the user, a strategy insight report for the user in a tabular format in a markdown language; and outputting, using the tabular format in the markdown language, the strategy insight report to the user in the graphical user interface.

9. The system of claim 8, the generating the sets of questions comprising:

generating the sets of questions based on a strategy, weakness, opportunity, and threat (SWOT) insight model, a first set of questions being associated with the strategy, a second set of questions being associated with the weakness, a third set of questions being associated the opportunity, and a fourth set of questions being associated with the threat.

10. The system of claim 8, the avoiding of the hallucinations comprising:

displaying a tag indicating an end of conversation responsive to determining that the answers are not associated with a current insight area of the plurality of insight areas.

11. The system of claim 8, the collecting the provided answers on the plurality of data models comprising:

collecting the provided answers on corresponding attributes of the plurality of data models.

12. The system of claim 8, the collecting the provided answers on the plurality of data models comprising:

collecting the provided answers as the text strings in association with corresponding attributes of the plurality of data models.

13. The system of claim 8, the generating the strategy insight report for the user further comprising:

generating the strategy insight report comprising a single-sentence summary of the user's business.

14. The system of claim 8, the generating the strategy insight report for the user further comprising:

generating a SWOT analysis report comprising recommended next steps for the user's business.

\* \* \* \* \*